(12) United States Patent
Namkung

(10) Patent No.: US 9,274,561 B2
(45) Date of Patent: Mar. 1, 2016

(54) DISPLAY DEVICES AND METHODS OF MANUFACTURING DISPLAY DEVICES

(71) Applicant: SAMSUNG DISPLAY CO., LTD., Yongin, Gyeonggi-Do (KR)

(72) Inventor: Jun Namkung, Asan-si (KR)

(73) Assignee: Samsung Display Co., Ltd., Yongins-Si (KR)

( * ) Notice: Subject to any disclaimer, the term of this patent is extended or adjusted under 35 U.S.C. 154(b) by 0 days.

(21) Appl. No.: 14/247,193

(22) Filed: Apr. 7, 2014

(65) Prior Publication Data

US 2015/0116959 A1 Apr. 30, 2015

(30) Foreign Application Priority Data

Oct. 30, 2013 (KR) .................. 10-2013-0129675

(51) Int. Cl.
*C09K 19/00* (2006.01)
*G06F 1/16* (2006.01)
*G09F 9/00* (2006.01)

(52) U.S. Cl.
CPC ............... *G06F 1/1652* (2013.01); *G09F 9/00* (2013.01); *Y10T 428/10* (2015.01); *Y10T 428/1059* (2015.01); *Y10T 428/1086* (2015.01)

(58) Field of Classification Search
CPC ... H05K 1/028; H05K 3/22; H05K 2201/051; H05K 2201/058; H05K 2201/068; H05K 2201/10128; H05K 2201/09009; Y10T 428/266; Y10T 428/269; Y10T 428/10; Y10T 428/1059; Y10T 428/1077; Y10T 428/1082; Y10T 428/1086; G02F 1/133305; B32B 2307/412; B32B 2307/542; B32B 2307/546; C03C 17/32; C03C 17/3405
USPC .......... 428/1.1, 1.5, 1.54, 1.55, 1.6, 213, 337, 428/220; 361/749; 257/E21.546; 156/60
See application file for complete search history.

(56) References Cited

U.S. PATENT DOCUMENTS

| | | |
|---|---|---|
| 2010/0022067 A1 | 1/2010 | Tang et al. |
| 2012/0196103 A1 | 8/2012 | Murashige et al. |
| 2012/0227809 A1 | 9/2012 | Bharti et al. |

FOREIGN PATENT DOCUMENTS

| | | |
|---|---|---|
| KR | 10-2011-0051195 | 5/2011 |
| KR | 10-2011-0067405 | 6/2011 |
| KR | 10-2012-0073286 | 7/2012 |
| KR | 10-2012-0094039 | 8/2012 |

*Primary Examiner* — Ruiyun Zhang
(74) *Attorney, Agent, or Firm* — Lewis Roca Rothgerber Christie LLP

(57) ABSTRACT

A display device having a base film, a display structure, and a window, the base film including a first bending region having a wrinkled portion and a first region adjacent to the first bending region, a display structure disposed on a first face of the base film, and a window covering the display structure disposed on the first face of the base film, the first bending region having a material different from a material in the first region.

11 Claims, 13 Drawing Sheets

DISPLAY DEVICES AND METHODS OF MANUFACTURING DISPLAY DEVICES

CROSS-REFERENCE TO RELATED APPLICATION

This application claims priority to and the benefit of Korean patent Application No. 10-2013-0129675, filed in the Korean Intellectual Property Office on Oct. 30, 2013, the disclosure of which is hereby incorporated by reference herein in its entirety.

BACKGROUND

1. Field

The invention relates to display devices and methods of manufacturing display devices. More particularly, of the invention relate to display devices including base films having a plurality of regions of different materials and/or protection films having a plurality of regions of different materials and methods of manufacturing the display devices.

2. Description of the Related Art

A display device may be employed in various electronic apparatuses such as a monitor, a television, a digital information display device, a laptop, a digital camera, a cellular phone, a smart phone, a smart pad, a personal digital assistant (PDA), a portable multimedia player (PMP), an MP3 player, a navigation system, a video camcorder, a game console, etc. Recently, display devices being light weight and small in size have been manufactured as users need portability and usability of the display devices. Further, a rollable display device or a bendable display device has been researched and developed. Such a rollable or bendable display device may generally include a base film, a display structure, a window, a protection film, etc.

However, rollable or the bendable display devices may include a base film and/or a protection film having a single region of a single material, so that the base film and/or the protection film may not reduce stress generated while rolling the display device or bending the display device. As a result, the display device may be damaged by stress.

SUMMARY

Example embodiments of the present invention provide a display device including a base film having a plurality of regions of different materials and/or a protection film having a plurality of regions of different materials to prevent damage caused by stress generated when rolling the display device or bending the display device.

Example embodiments of the present invention provide a method of manufacturing the display device including a base film having a plurality of regions of different materials and/or a protection film having a plurality of regions of different materials to prevent damage caused by stress generated when rolling the display device or bending the display device.

According to an aspect of the invention, there is provided a display device including a base film, a display structure, and a window. The base film may include a first bending region having a wrinkled portion and a first region adjacent to the first bending region. The display structure may be disposed on a first face of the base film. The window may be disposed on the first face of the base film and may cover the display structure. The first bending region may include a material different from a material of the first region.

In example embodiments, the first bending region may include a first material having a first modulus of elasticity, and the first region may include a second material having a second modulus of elasticity substantially greater than the first modulus of elasticity.

In some example embodiments, the first bending region may include a first material having a first coefficient of thermal expansion, and the first region may include a second material having a second coefficient of thermal expansion substantially smaller than the first coefficient of thermal expansion.

In example embodiments, the first bending region may reduce stress generated when rolling the display device or bending the display device.

In some example embodiments, a protection film may be additionally disposed on a second face of the base film opposed to the first face of the base film.

In example embodiments, the protection film may include a second bending region having a wrinkled portion and a second region adjacent to the second bending region. In this case, the second bending region may include a material different from a material of the second region.

In example embodiments, the second bending region may include a third material having a third modulus of elasticity, and the second region may include a fourth material having a fourth modulus of elasticity substantially greater than the third modulus of elasticity.

In some example embodiments, the second bending region may include a third material having a third coefficient of thermal expansion, and the second region may include a fourth material having a fourth coefficient of thermal expansion substantially smaller than the third coefficient of thermal expansion.

In example embodiments, the second bending region may reduce a stress generated in rolling of the display device or bending of the display device.

In example embodiments, the first material may include polypropylene, polymethylmethacrylate, polydimethylsiloxane and/or SU-8 photoresist.

In example embodiments, the second material may include polystyrene based resin, polycarbonate-based resin, polyester-based resin, polyethyleneterephthalate-based resin, polyethylenenaphthalate-based resin, polysulfone-based resin, polyurethane-based resin and/or polyvinyl chloride-based resin.

According to another aspect of the invention, there is provided a method of manufacturing a display device. In the method, a supporting substrate may be provided. A base film may be formed on a first face of the supporting substrate. The base film may be expanded. A display structure may be formed on a first face of the base film. A window may be formed on the first face of the base film to cover the display structure. The base film may be constructed to form a first bending region including a wrinkled portion and a first region adjacent to the first bending region in the base film. A laser may be irradiated onto a second face of the supporting substrate opposed to the first face of the supporting substrate to separate the base film from the supporting substrate.

In the formation of the base film according to example embodiments, a first base thin film may be formed on the first face of the supporting substrate. A second base film may be formed on the first base film using a material different from a material of the first base thin film. A third base film may be formed on the second base film using a material substantially the same as the material of the first base film. The first to the third base films may be cut.

In example embodiments, the first to the third base films may be cut by a slit coating process.

In example embodiments, the second base film may be formed using a first material having a first modulus of elasticity, and the first base film and the third base film may be formed using a second material having a second modulus of elasticity substantially greater than the first modulus of elasticity.

In some example embodiments, the second base film may be formed using a first material having a first coefficient of thermal expansion, and the first base film and the third base film may be formed using a second material having a second coefficient of thermal expansion substantially smaller than the first coefficient of thermal expansion.

In the expansion of the base film according to example embodiments, the base film may be physically expanded by applying a predetermined force to the base film, or thermally expanded by heating the base film.

In the contraction of the base film according to example embodiments, the base film may be physically contracted by removing the predetermined force applied to the base film, or thermally contracted by cooling the base film.

In some example embodiments, a protection film may be additionally formed on a second face of the base film opposed to the first face of the base film.

In the formation of the protection film according to example embodiments, providing a first protection film may be formed on the second face of the base film. A second protection film may be formed on the first protection film using a material different from a material of the first protection film. A third protection film may be formed on the second protection film using a material substantially the same as the material of the first protection film. The first to the third protection films may be cut.

In the formation of the protection film according to example embodiments, the protection film may be expanded. The protection film may be contracted to form a second bending region including a wrinkled portion and a second region adjacent to the second bending region on the protection film. The protection film may be attached on the second face of the base film by interposing an adhesive member between the base film and the protection film.

According to example embodiments, the display device may include a base film having a first bending region containing a wrinkled portion and a first region adjacent to the first bending region, and a protection film having a second bending region containing a wrinkled portion and a second region adjacent to the second bending region. Thus, the base film and/or the protection film may effectively reduce or remove stress generated in processes for rolling or bending the display device. As a result, damages (e.g., a crack, etc.) caused by the stress to the display device may be efficiently prevented by the base film and the protection film.

According to example embodiments, in a method of manufacturing a display device, a display structure, a window, etc. may be formed on a first face of a base film after expanding the base film, and then the base film may be contracted to form a first bending region including a wrinkled portion and a first region adjacent to the first bending region of the base film. Alternatively, a protection film may be formed on a second face of the base film opposed to the first face of the base film. The protection film may include a second bending region having a wrinkled portion and a second region adjacent to the second bending region. Therefore, damages caused in rolling of the display device or bending of the display device may be efficiently reduced or removed by the base film and/or the protection film.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Hereinafter, display devices and methods of manufacturing display devices in accordance with example embodiments will be explained in detail with reference to the accompanying drawings.

Figure 1:
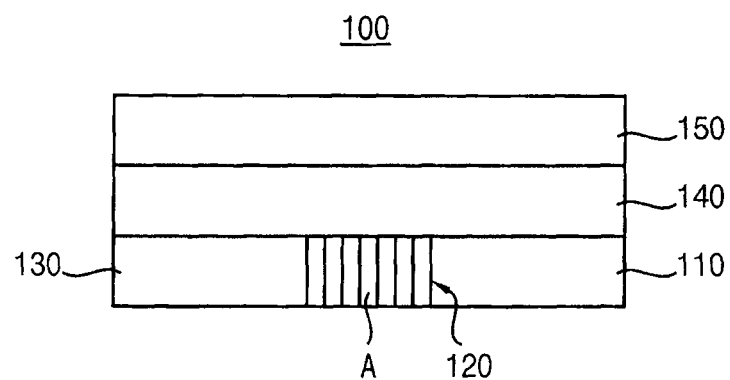
FIG. 1 is a cross-sectional view illustrating a display device in accordance with example embodiments of the present invention.

FIG. 1 is a cross-sectional view illustrating a display device in accordance with an example embodiment.

Referring to FIG. 1, a display device 100 may include a base film 110, a display structure 140, a window 150.

The base film 110 may include a first bending region 120 and a first region 130 adjacent to the first bending region 120. For example, the first bending region 120 may include a material different from a material of the first region 130. In example embodiments, the first bending region 120 may be formed considering a direction where the display device 100 is rolled or bended. In example embodiments, when the display device 100 is rolled or bent along a left direction or a right direction, the first bending region 120 may be located on a left side of the base film 110 or a right side of the base film 110. In some example embodiments, when the display device 100 is rolled or bent along an upper direction or a lower direction, the first bending region 120 may be located on an upper side of the base film 110 or a lower side of the base film 110. In other example embodiments, when the display device 100 is rolled or bent along a left direction, a right direction, an upper direction or a lower direction, the first bending region 120 may be located on a left side of the base film 110, a right side of the base film 110, an upper side of the base film 110 or a lower side of the base film 110. In order words, the display device 100 may be rolled or bent on the basis of the first bending region 120.

In example embodiments, the first bending region 120 may include a modulus of elasticity different from that of the first region 130. For example, the first bending region 120 may include a first material having a first modulus of elasticity, and the first region 130 may include a second material having a second modulus of elasticity different from the first modulus of elasticity of the first bending region 120. In some example embodiments, the first bending region 120 may include a coefficient of thermal expansion different from that of the first region 130. For example, the first bending region 120 may include a first material having a first coefficient of thermal expansion, and the first region 130 may include a second material having a second coefficient of thermal expansion different from the first coefficient of thermal expansion of the first bending region 120. Thus, the first bending region 120 may have a rate of expansion different from a rate of expansion in the first region 130, and also the first bending region 120 may have a rate of contraction different from a rate of contraction in the first region 130. Accordingly, the first bending region 120 and the first region 130 may have different rates of expansion or rates of contraction, so that a wrinkled portion A may be formed based on a difference between the rates of expansion or a difference between the rates of contraction. For example, the base film 110 may be expanded, and then subsequent processes (e.g., processes of forming the display structure 140 and the window 150, etc.) may be performed on an expanded base film 110. Then, the expanded base film 110 may be contracted to form the wrinkled portion A in the first bending region 120.

In example embodiments, a first tensile stress may be generated in the first bending region 120 including the first material having the first modulus of elasticity or the first coefficient of thermal expansion while the base film 110 is expanded. Here, a first compressive stress may be generated in the first bending region 120 while the base film 110 is contracted. In addition, a second tensile stress substantially smaller than the first tensile stress may be generated in the first region 130 including the second material having the second modulus of elasticity substantially larger than the first modulus of elasticity or the second coefficient of thermal expansion substantially smaller than the first coefficient of thermal expansion. Here, a second compressive stress substantially smaller than the first compressive stress may be generated in the first bending region 120 while the base film 110 is contracted. Therefore, the wrinkled portion A may be formed in the first bending region 120 due to a difference between the tensile stress of the first bending region 120 and the tensile stress of the first region 130 and/or a difference between the compressive stress of the first bending region 120 and the compressive stress of the first region 130.

In example embodiments, when a predetermined force (e.g., an external force) is applied to the base film 110, the base film 110 may be physically expanded. In addition, when the predetermined force (e.g., the external force) is reduced or removed from the base film 110, the base film 110 may be physically contracted. However, the methods of expanding or contracting the base film 110 may be not limited thereto. In some example embodiments, when the base film 110 is heated, the base film 110 may be thermally expanded. Additionally, when the base film 110 is cooled, the base film 110 may be thermally contracted. In example embodiments, when the base film 110 includes the first bending region 120 including the first material having the first modulus of elasticity and the first region 130 including the second material having the second modulus of elasticity substantially larger than the first modulus of elasticity, the base film 110 may physically expand or contract. In some example embodiments, when the base film 110 includes the first bending region 120 including the first material having the first coefficient of thermal expansion and the first region 130 including the second material having the second coefficient of thermal expansion substantially smaller than the first coefficient of thermal expansion, the base film 110 may be thermally expanded or contracted. In other example embodiments, the base film 110 may be expanded by heating the base film 110 and applying the predetermined force (e.g., the external force) to the base film 110 at the same time.

When the first bending region 120 includes the first material having the first modulus of elasticity, examples of the first material may include epoxy-based polymer, acrylic-based polymer, urethane-based polymer, etc. These may be used alone or in a combination thereof. In example embodiments, the first bending region 120 may be formed using a first liquid mixture containing polystyrene based resin, polycarbonate-based resin, polyester-based resin, polyethyleneterephthalate-based resin, polyethylenenaphthalate-based resin, polysulfone-based resin, polyurethane-based resin, polyvinyl chloride-based resin, etc. In some example embodiments, the first bending region 120 may be formed using a second liquid mixture in which a carbon nano tube, a graphene composite, a silver (Ag) nano wire, a glass fiber, or other material are dispersed in the first liquid mixture containing polypropylene, polymethylmethacrylate, polydimethylsiloxane, SU-8 photoresist, etc.

The first region 130 may include the second material having the second modulus of elasticity substantially larger than the first modulus of elasticity. Thus, the second material may have a relatively high strength. Examples of the second material may include an engineering resin. For example, the first region 130 may be formed using a third liquid mixture containing a polystyrene-based resin, a polycarbonate-based resin, a polyester-based resin, a polyethyleneterephthalate-based resin, a polyethylenenaphthalate-based resin, a polysulfone-based resin, a polyurethane-based resin, a polyvinyl chloride-based resin, etc.

A conventional base film includes a single region of a single material, so that the conventional base film may hardly reduce or remove external impacts (e.g., a stress generated in rolling of the conventional display device or bending of the conventional display device), thereby causing damages to the display device. On the other hand, the base film 110 according to example embodiments may include the first bending region 120 of the first material and the first region 130 of the second material. Here, the first bending region 120 and the first region 130 may have the different rates of expansion and/or the different rates of contraction. Thus, the wrinkled portion A may be provided in the first bending region 120. In example embodiments, an initial compressive stress (i.e., a first compressive stress) may be generated in the wrinkled portion A of the first bending region 120, such that the base film 110 may effectively reduce or remove a tensile stress generated after applying an external impact to the base film 110. As a result, damages to the display device 100 caused by the external impact may be efficiently prevented by the base film 110.

Although the display device 100 illustrated in FIG. 1 may include the base film 110 having two regions (e.g., the first bending region 120 and the first region 130), the invention may not be limited to such a construction. For example, the base film 110 may include a plurality of bending regions in accordance with rolled regions of the display device 100 or bent regions of the display device 100.

The display structure 140 may be disposed on a first face of the base film 110. For example, the display structure 140 may include a switching element, wirings, insulation layers, an organic light emitting element, etc. Here, the switching element may have a thin film transistor or an oxide semiconductor element. According to example embodiments, the display structure 140 may include a liquid crystal structure instead of the organic light emitting structure.

As illustrated in FIG. 1, the window 150 may be disposed on the first face of the base film 110 to cover the display structure 140. Thus, the window 150 may protect the display structure 140. The window 150 may include a transparent insulation material. For example, the window 150 may include a glass substrate, a quartz substrate, a transparent resin substrate, etc. Examples of the transparent resin substrate for the window 150 may include polyimide-based resin, acryl-based resin, polyacrylate-based resin, polycarbonate-based resin, polyether-based resin, sulfonic acid-based resin, polyethyleneterephthalate-based resin, etc.

A conventional base film includes a single region of a single material, so that the conventional base film may hardly reduce or remove the stress generated in rolling of the conventional display device or bending of the conventional display device, thereby causing damage to the conventional display device. Considering these problems, the display device 100 according to example embodiments may include the base film 110 having the plurality of regions of different materials. Thus, the wrinkled portion A may be formed in the base film 110. The initial compressive stress (i.e., the first compressive stress) may be generated by the wrinkled portion A before applying the external impact to the base film 110, thereby reducing or removing the tensile stress generated after applying the external impact to the base film 110. As a result, damage to the display device 100 caused by the rolling of or the bending of the display device 100 may be prevented by the base film 110.

Figure 2:
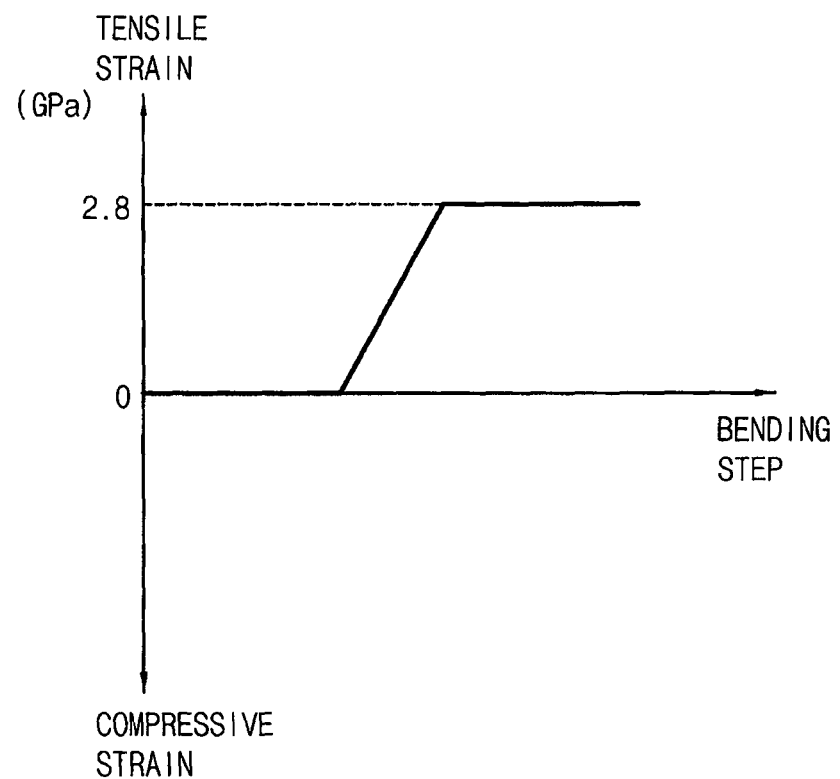
FIG. 2 is a graph illustrating strain of a display device including a base film having a single region containing a single material.
Figure 3:
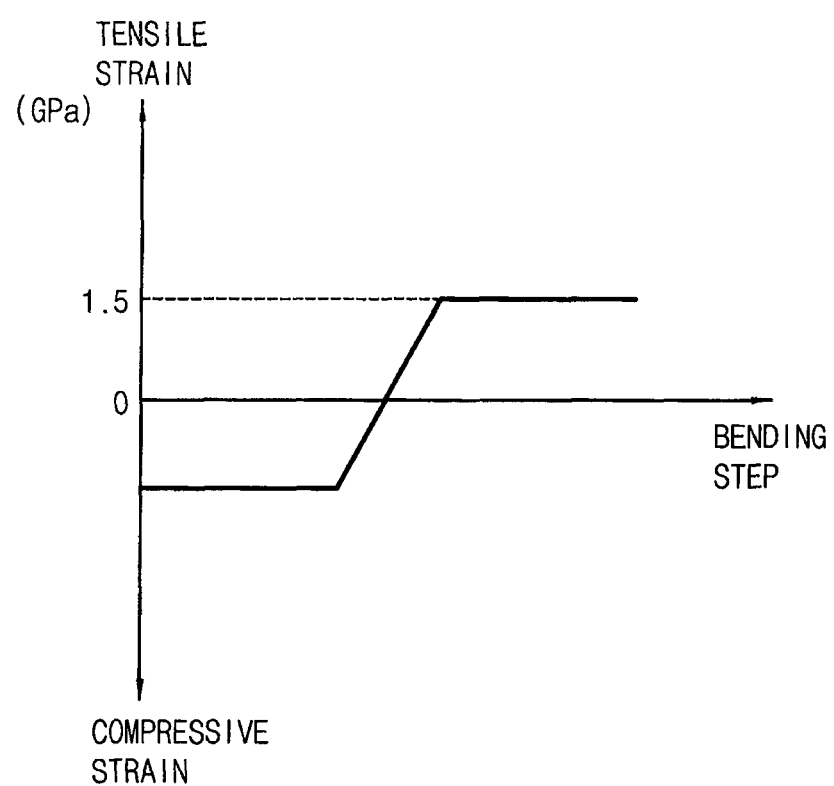
FIG. 3 is a graph illustrating strain of a display device including a base film having a plurality of regions containing different materials.

FIG. 2 is a graph illustrating strain of a display device including a base film having a single region containing a single material. FIG. 3 is a graph illustrating strain of a display device including a base film having a plurality of regions containing different materials.

Referring to FIG. 2, when a display device includes a base film having a single region containing a single material, a compressive stress generated in the display device may be substantially zero before rolling or bending the display device. (i.e., the compressive stress is not generated in the display device.) As the display device is further rolled or bent, the compressive stress increases. In this example, a final compressive stress generated in the display device may be about 2.8 GPa.

Referring to FIG. 3, when a display device according to example embodiments includes a base film having a plurality of regions of different materials, a first compressive stress may be generated in the base film before rolling or bending of the display device. As the display device is further rolled or bent, the compressive stress increases. However, the compressive stress may be reduced as much the first compressive stress. Here, a final compressive stress generated in the display device may be about 1.5 GPa. The final compressive stress is relatively smaller than the final compressive stress generated in the display device of FIG. 2. That is, the compressive stress generated in the display device according to example embodiments may decrease by about fifty percent compared with the conventional display device. As a result, when the display device includes the base film having the plurality of the regions containing different materials, damage to the display device caused by stress generated in rolling or bending of the display device may be efficiently prevented by the base film.

Figure 4:
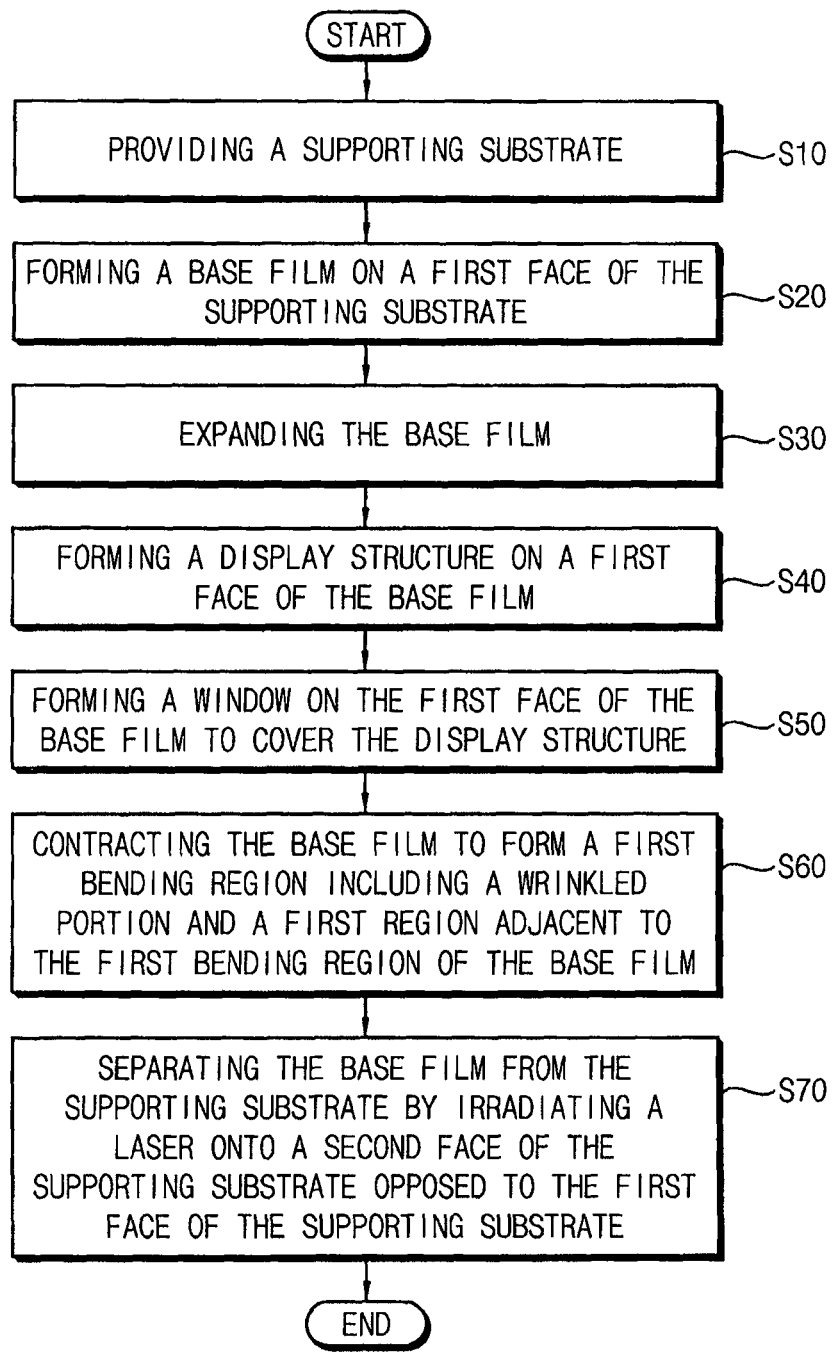
FIG. 4 is a flow chart illustrating a method of manufacturing a display device in accordance with example embodiments of the present invention.
Figure 5:
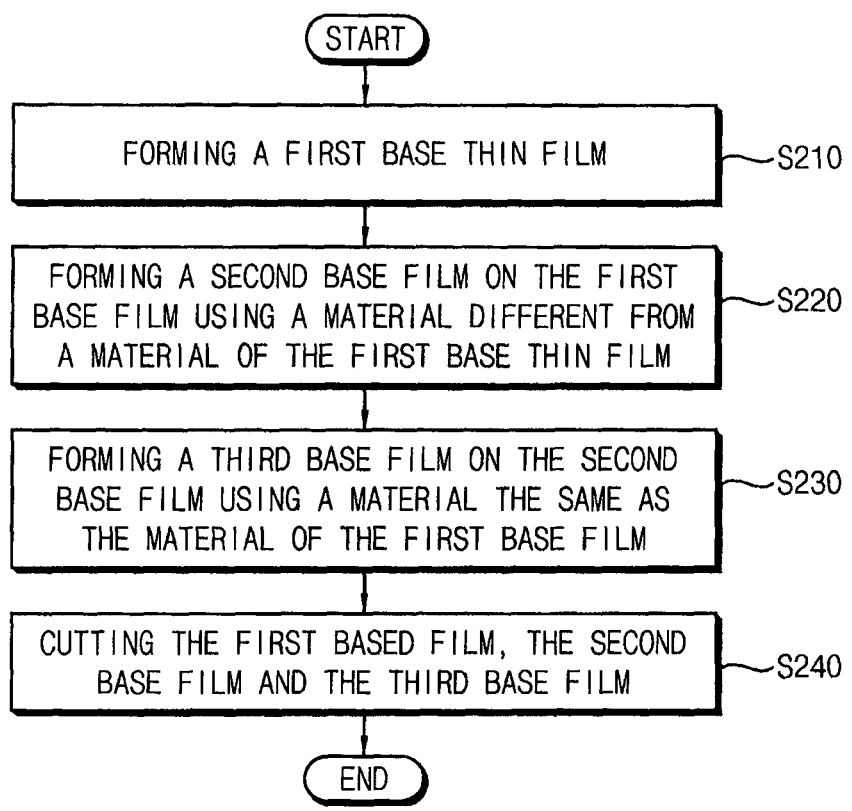
FIG. 5 is a flow chart illustrating a method of manufacturing a base film in accordance with example embodiments.

FIG. 4 is a flow chart illustrating a method of manufacturing a display device in accordance with example embodiments of the present invention. FIG. 5 is a flow chart illustrating a method of manufacturing a base film in accordance with example embodiments. FIGS. 6 through 11 are cross-sectional views illustrating a method of manufacturing a display device in accordance with some example embodiments.

Figure 6:
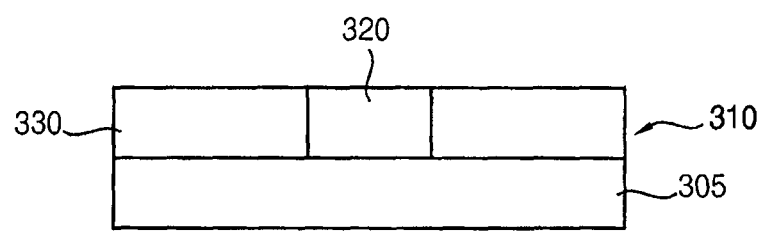
FIGS. 6 through 11 are cross-sectional views illustrating a method of manufacturing a display device in accordance with some example embodiments.

Referring to FIGS. 4 through 6, a supporting substrate 305 may be provided (step S10), and then a base film 310 may be formed on the supporting substrate 305 (step S20). In example embodiments, a first bending region 320 may be formed using a material different from a material of a first region 330. Thus, different tensile stresses and/or compressive stresses may be generated in the first bending region 320 and the first region 330, respectively in subsequent processes for manufacturing the display device. As a result, a wrinkled portion B (FIG. 9) may be formed in the first bending region 320. A method of forming the wrinkled portion B will be described subsequently herein.

Hereinafter, a method of forming the base film 310 will be described in more detail.

As illustrated in FIG. 5, a first base thin film may be formed on a substrate (step S210), and then a second base thin film may be formed on the first base thin film using a material different from a material of the first base thin film (step S220).

A third base thin film may be formed on the second base thin film using a material substantially the same as a material of the first base thin film (step S230). The base film 310 may be obtained by cutting the first base thin film, the second base thin film, and the third base thin film (step S240). Here, the base film 310 including the first to the third base thin films may be formed using a slit coating process. In example embodiments, a portion of the base film 310 in which the second base thin film is located may correspond to a region of the display device which is rolled or bent. For convenience of description, the portion of the base film 310 in which the second base thin film is located after cutting the first to the third base thin films may be defined as the first bending region 320, and a portion of the base film 310 in which the first base thin film and the third base thin film is located after cutting the first to third base thin films may be defined as the first region 330.

Figure 7:
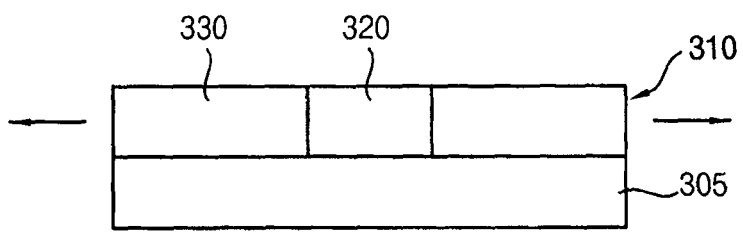

Referring to FIGS. 4 and 7, the base film 310 may be expanded (step S30). In example embodiments, the base film 310 may be physically expanded by applying a predetermined force (e.g., an external force) to the base film 310. However, a process of expanding the base film 310 is not limited thereto. For example, the base film 310 may be thermally expanded by heating the base film 310. As described with reference to FIG. 1, the first tensile stress may be generated in the first bending region 320 including the first material having the first modulus of elasticity or the first coefficient of thermal expansion while the base film 310 is expanded. In addition, the second tensile stress may be generated in the first region 330 including the second material having the second modulus of elasticity substantially larger than the first modulus of elasticity or the second coefficient of thermal expansion substantially smaller than the first coefficient of thermal expansion while the base film 310 is expanded. Here, the first tensile stress may be substantially larger than the second tensile stress. Then, a wrinkled portion B (FIG. 9) may be formed in the first bending region 320 due to a difference between the tensile stress of the first bending region 320 and the tensile stress of the first region 330 and a difference between the compressive stress of the first bending region 320 and the compressive stress of the first region 330. As a result, the stress generated in rolling or bending of the display device may be efficiently prevented by the base film 310.

Figure 8:
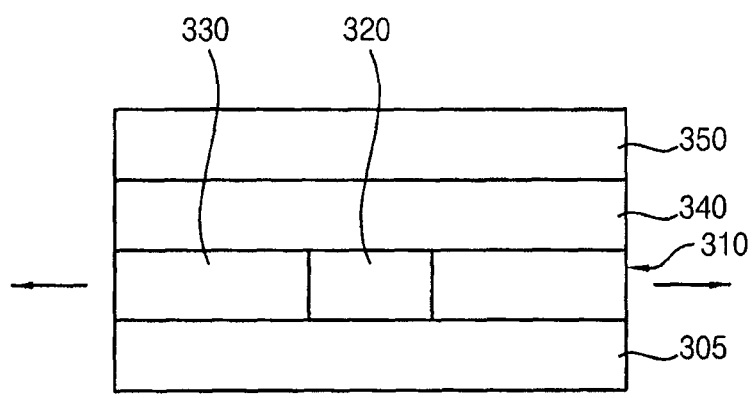

Referring to FIGS. 4 and 8, a display structure 340 may be formed on a first face of the base film 310 (step S40). For example, the display structure 340 may include an organic light emitting element. Alternatively, the display structure 340 may include a liquid crystal element.

A window 350 may be formed on the first face of the base film 310 to cover the display structure 340 (step S50). For example, the window 350 may include a glass substrate, a quartz substrate, a transparent resin substrate, etc.

Figure 9:
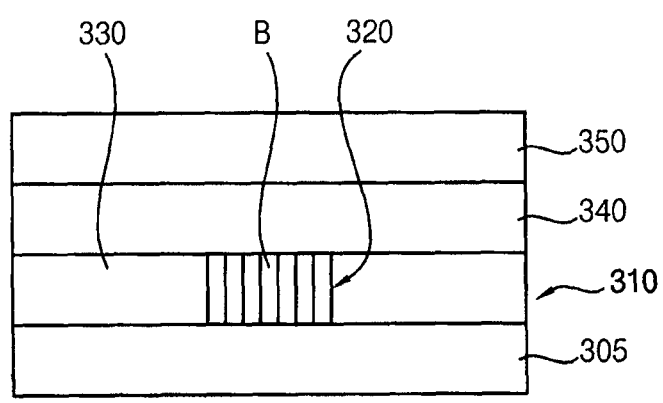

Referring to FIGS. 4 and 9, the base film 310 may be contracted to form the first bending region 320 including the wrinkled portion B and the first region 330 adjacent to the first bending region 320 in the base film 310 (step S60). In example embodiments, the predetermined force (e.g., the external force) applied to the base film 310 may be removed to physically contract the base film 310. In some example embodiments, the base film 310 is cooled to thermally contract the base film 310. The first compressive stress may be generated in the first bending region 320 while the base film 310 is contracted. In addition, the second tensile stress may be generated in the first region 330 including the second material having the second modulus of elasticity substantially larger than the first modulus of elasticity or the second coefficient of thermal expansion substantially smaller than the first coefficient of thermal expansion. Here, the first compressive stress is substantially larger than the second compressive stress, so that there is a difference between the tensile stress of the first bending region 320 and the tensile stress of the first region 330 and/or a difference between the compressive stress of the first bending region 320 and the compressive stress of the first region 330. As a result, the stress generated in rolling or bending of the display device may be efficiently prevented by the base film 310.

Figure 10:
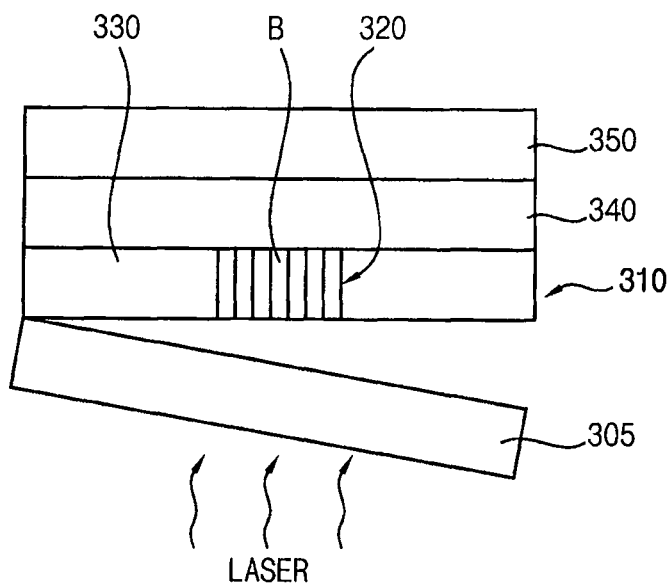
Figure 11:
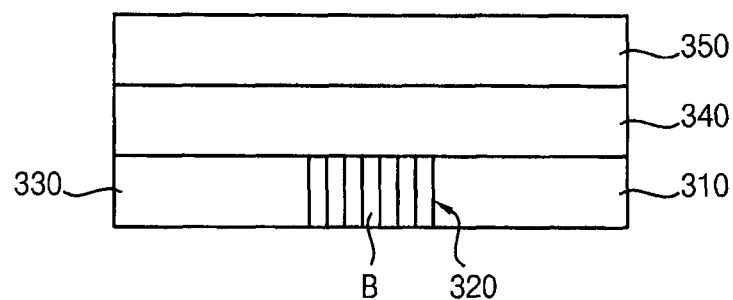

Referring to FIGS. 4 and 10, a laser may be irradiated onto a second face opposed to the first face of the base film 310 to separate the base film 310 from the supporting substrate 305 (step S70). Accordingly, as illustrated in FIG. 11, the display device including the base film having the wrinkled portion B, the display structure 340, the window 350, etc. may be obtained.

The method of FIGS. 4 to 11 may manufacture the display device by forming the base film 310 on the supporting substrate 305, by forming the display structure 340, the window 350 on the base film 310, and by separating the base film 310 from the supporting substrate 305. However, the method of manufacturing the display device is not limited thereto. For example, the display device may be sequentially formed using a roll-to-roll process.

Figure 12:
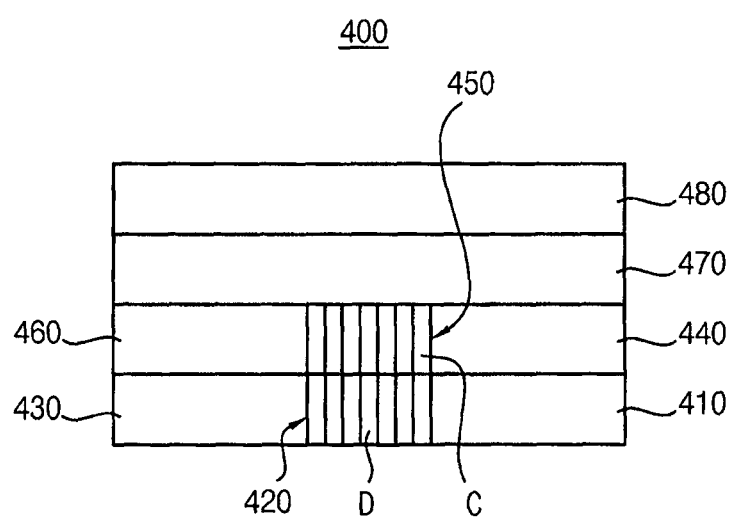
FIG. 12 is cross-sectional view illustrating a display device in accordance with some example embodiments.

FIG. 12 is cross-sectional view illustrating a display device in accordance with another example embodiment.

Referring to FIG. 12, a display device 400 may include a protection film 410, a base film 440, a display structure 470, and a window 480. The display device 400 may have a configuration substantially the same as or substantially similar to that of the display device 100 described with reference to FIG. 1 except for a protection film 410.

The protection film 410 may include a second bending region 420 and a second region 430 adjacent to the second bending region 420. The second bending region 420 may include a material different from a material of the second region 430. In example embodiments, the second bending region 420 may be formed on the basis of a direction where the display device 400 is rolled or bent. The display device 400 may be substantially rolled or bent on the basis of the second bending region 420.

For example, the second bending region 420 may include a modulus of elasticity different from a modulus of elasticity in the second region 430. For example, the second bending region 420 may include a third material having a third modulus of elasticity, and the second region 430 may include a fourth material having a fourth modulus of elasticity substantially larger than the third modulus of elasticity. Alternatively, the second bending region 420 may include a third material having a third coefficient of thermal expansion, and the second region 430 may include a fourth material having a fourth coefficient of thermal expansion substantially smaller than the third coefficient of thermal expansion. Thus, the second bending region 420 and the second region 430 may have different rates of expansion or different rates of contraction, so that a wrinkled portion D may be formed in accordance with a difference between the rates of expansion or a difference between the rates of contraction.

In example embodiments, when a predetermined force (e.g., an external force) is applied to the protection film 410, the protection film 410 may be physically expanded. In addition, when the predetermined force (e.g., the external force) is removed from the protection film 410, the protection film 410 may be physically contracted. However, processes of expanding and contracting the protection film 410 are not limited thereto. In other example embodiments, when the protection film 410 is heated, the protection film 410 may be thermally expanded. Further, when the protection film 410 is cooled, the protection film 410 may be thermally contracted. In example embodiments, when the protection film 410 includes the second bending region 420 containing the third material having the third modulus of elasticity and the second region 430 containing the fourth material having the fourth modulus of elasticity substantially larger than the third modulus of elasticity, the protection film 410 may be physically expanded or contracted. In some example embodiments, when the protection film 410 includes the second bending region 420 containing the third material having the third coefficient of thermal expansion and the second region 430 containing the fourth material having the fourth coefficient of thermal expansion substantially smaller than the third coefficient of thermal expansion, the protection film 410 may be thermally expanded or contracted. In other example embodiments, the protection film 410 may be expanded by applying the predetermined force (e.g., the external force) to the protection film 410 while the protection film 410 is heated.

In example embodiments, a third tensile stress may be generated in the second bending region 420 including the third material having the third modulus of elasticity or the third coefficient of thermal expansion while the protection film 410 is expanded. Here, a third compressive stress may be generated in the second bending region 420 while the protection film 410 is contracted. In addition, a fourth tensile stress substantially smaller than the third tensile stress may be generated in the second region 430 including a fourth material having a fourth modulus of elasticity substantially larger than the third modulus of elasticity or a fourth coefficient of thermal expansion substantially smaller than the third coefficient of thermal expansion while the protection film 410 is expanded. Further, a fourth compressive stress substantially smaller than the third compressive stress may be generated in the second region 430 while the protection film 410 is contracted. As a result, the wrinkled portion D may be formed in the second bending region 420 due to a difference between the tensile stress of the second bending region 420 and the tensile stress of the second region 430 and/or a difference between the compressive stress of the second bending region 420 and the compressive stress of the second region 430.

The conventional protection film includes a single region of a single material, so that the conventional protection film may hardly reduce or remove an external impacts (e.g., a stress generated in rolling or bending of the display device.), thereby causing damages to the display device. On the other hand, the protection film 410 according to example embodiments may include the second bending region 420 of the third material and the second region 430 of the fourth material. Here, the second bending region 420 and the second region 430 may have the different rates of expansion and/or the different rates of contraction. Thus, the wrinkled portion D may be provided in the second bending region 420. In example embodiments, an initial compressive stress (i.e., a first compressive stress) may be generated in the wrinkled portion D of the second bending region 420, such that the protection film 410 may effectively reduce or remove the tensile stress generated after applying the external impact to the display device 400. As a result, damage to the display device 400 caused by the external impact may be efficiently prevented by the protection film 410.

The base film 440 may include a first bending region 450 and a first region 460 adjacent to the first bending region 450. In example embodiments, the first bending region 450 may include a first material having a first modulus of elasticity, and the first region 460 may include a second material having a second modulus of elasticity different from the first modulus of elasticity. In other example embodiments, the first bending region 450 may include a first material having a first coefficient of thermal expansion, and the first region 460 may include a second material having a second coefficient of thermal expansion different from the first coefficient of thermal expansion. Thus, the first bending region 450 and the first region 460 may include different rates of expansion or different rates of contraction, so that a wrinkled portion C may be formed based on a difference between the rates of expansion or a difference between the rates of contraction. For example, the base film 440 may be expanded, and then subsequent processes may be performed on expanded base film 440. Subsequently, the expanded base film 440 may be contracted to form the wrinkled portion C. Since the method of forming the wrinkled portion is already described above, detailed descriptions thereof will be omitted. The first bending region 450 including the wrinkled portion C may correspond to a region of the display device which is rolled or bent. Here, the first bending region 450 may effectively reduce or remove the stress generated in rolling of the display device 400 or bending of the display device 400. As a result, damage (e.g., a crack) to the display device 400 caused by the stress may be efficiently prevented by the base film 440.

The display structure 470 may be disposed on a first face of the base film 440. For example, the display structure 470 may include an organic light emitting element or a liquid crystal element.

The window 480 may be disposed on a first face of the base film 440 to cover the display structure 470. The window 480 may protect the display structure 470. For example, the window 480 may include a transparent insulation material.

In FIG. 12, the protection film 410 and the base film 440 may include the plurality of regions having the different rates of expansion and/or the different rates of contraction, respectively. Alternatively, at least one of the protection film 410 and the base film 440 may include a single region of a single material.

The conventional base film includes the single region of the single material, so that the conventional base film may hardly reduce or remove the stress generated in rolling or bending of the conventional display device, thereby causing damage to the display device. On the other hand, the display device 400 according to example embodiments may include the base film 440 having the plurality of regions of different materials and/or the protection film 410 having the plurality of regions of different materials. As a result, damage to the display device 400 caused by stress may be efficiently prevented by the base film 440 and/or the protection film 410.

Figure 13:
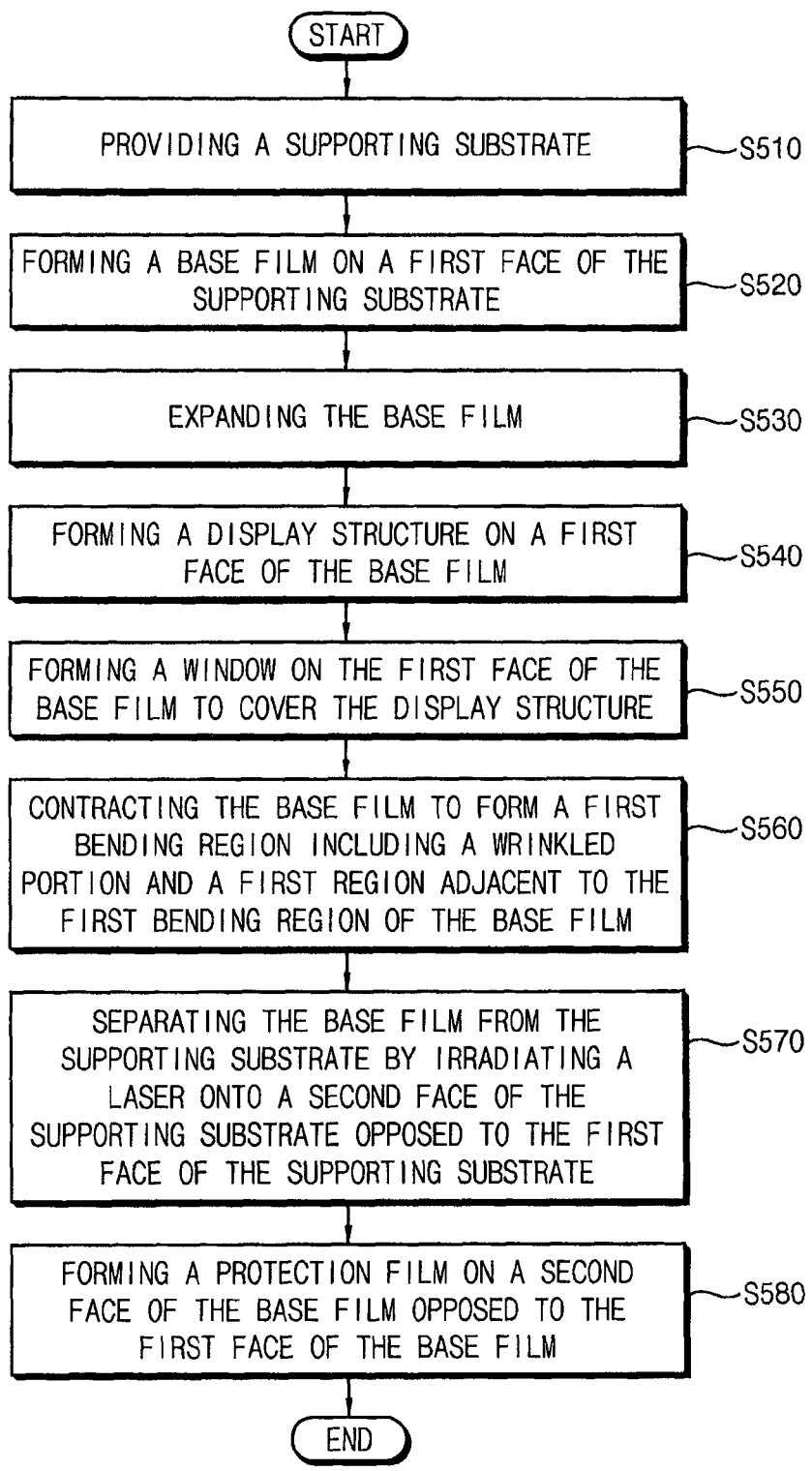
FIG. 13 is a flow chart illustrating a method of manufacturing a display device in accordance with some example embodiments.
Figure 14:
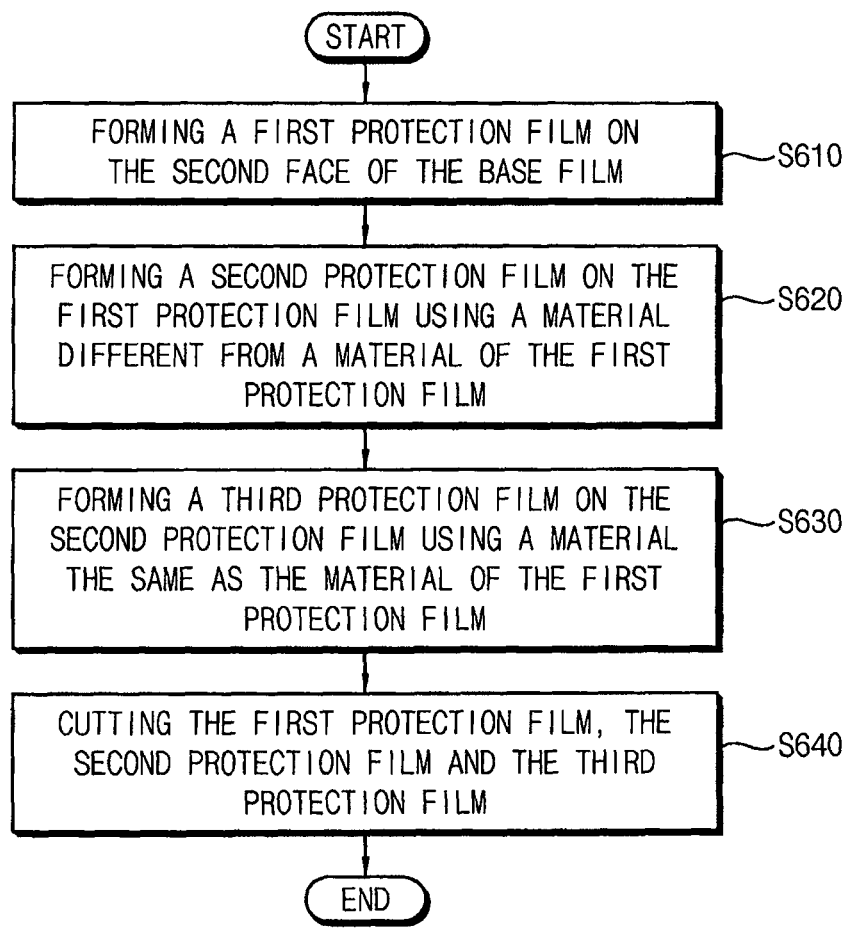
FIG. 14 is a flow chart illustrating a method of manufacturing a protection film of a display device in accordance with some example embodiments.

FIG. 13 is a flow chart illustrating a method of manufacturing a display device in accordance with some example embodiments. FIG. 14 is a flow chart illustrating a method of manufacturing a protection film of a display device in accordance with some example embodiments. FIGS. 15 through 20 are cross-sectional views illustrating a display device manufactured in accordance with the method of some example embodiments. The method of manufacturing the display device may be substantially the same as or substantially similar to the method of manufacturing the display device described with reference to FIG. 11 except a protection film 760.

Figure 15:
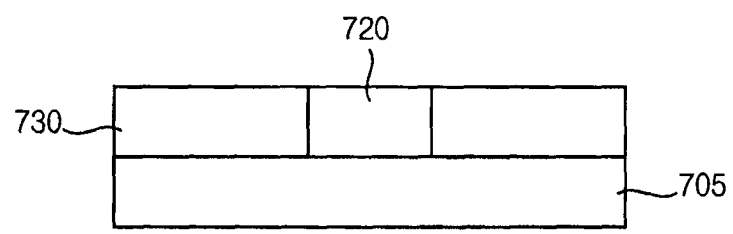
FIGS. 15 through 20 are cross-sectional views illustrating a method of manufacturing a display device in accordance with some example embodiments.

Referring to FIGS. 13 and 15, a supporting substrate 705 may be provided (step S510), and then a base film 710 (FIG. 16) may be formed on the supporting substrate 705 (step S520).

Figure 16:
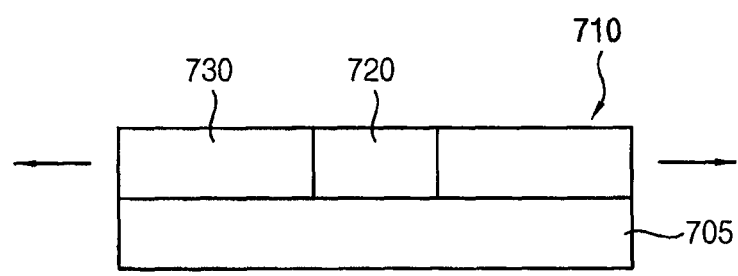

Referring to FIGS. 13 and 16, the base film 710 may be expanded (step S530). In example embodiments, the base film 710 may be physically expanded by applying a predetermined force (e.g., an external force) to the base film 710. However, a process of expanding the base film 710 is not limited thereto. For example, the base film 710 may be thermally expanded by heating the base film 710. As described above, a first tensile stress may be generated in the first bending region 720 including a first material having a first modulus of elasticity or a first coefficient of thermal expansion while the base film 710 is expanded. In addition, a second tensile stress may be generated in the first region 730 including a second material having a second modulus of elasticity substantially larger than the first modulus of elasticity or a second coefficient of thermal expansion substantially smaller than the first coefficient of thermal expansion while the base film 710 is expanded. Here, the first tensile stress may be substantially larger than the second tensile stress. Subsequently, a wrinkled portion E (FIG. 18) may be formed in the first bending region 720 due to a difference between the tensile stress of the first bending region 720 and the tensile stress of the first region 730 and a difference between the compressive stress of the first bending region 720 and the compressive stress of the first region 730. As a result, a stress generated in processes for rolling or bending the display device may be efficiently prevented by the base film 710.

Figure 17:
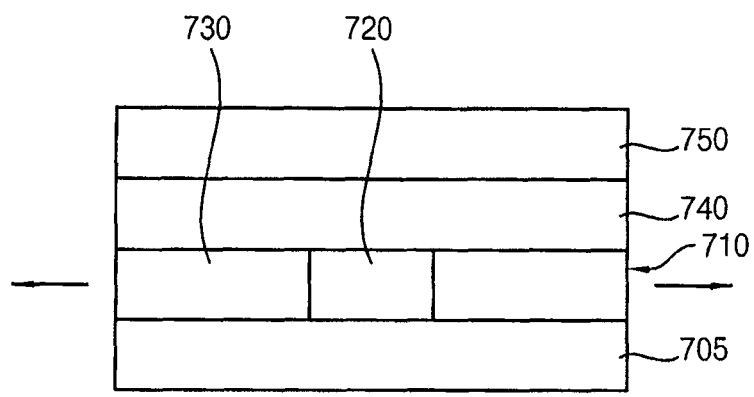

Referring to FIGS. 13 and 17, a display structure 740 may be formed on a first face of the base film 710 (step S540). For example, the display structure 740 may include an organic light emitting element. Alternatively, the display structure 740 may include a liquid crystal element. Then, a window 750 may be formed on the first face of the base film 710 to cover the display structure 740 (step S550). For example, the window 750 may include a glass substrate, a quartz substrate, a transparent resin substrate, etc.

Figure 18:
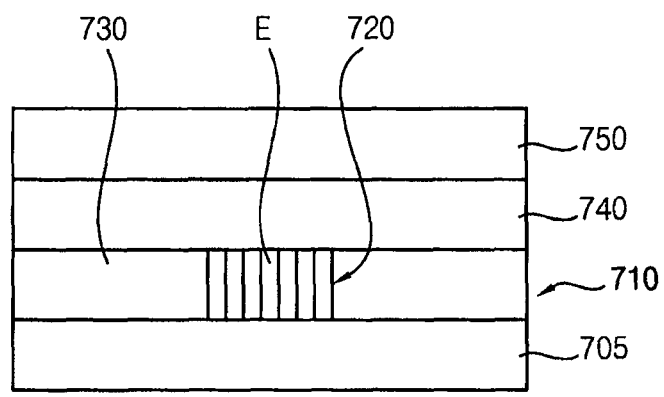

Referring to FIGS. 13 and 18, the base film 710 may be contracted to form the first bending region 720 including the wrinkled portion E and the first region 730 adjacent to the first bending region 720 in the base film 710 (step S560). In example embodiments, the predetermined force (e.g., the external force) applied to the base film 710 may be removed to physically contract the base film 710. In some example embodiments, the base film 710 may be cooled to thermally contract the base film 710. A first compressive stress may be generated in the first bending region 720 while the base film 710 is contracted. In addition, a second tensile stress may be generated in the first region 730 including the second material having the second modulus of elasticity substantially larger than the first modulus of elasticity or the second coefficient of thermal expansion substantially larger than the first coefficient of thermal expansion. Here, a first compressive stress is substantially larger than the second compressive stress, so that a difference between the tensile stress of the first bending region 720 and the tensile stress of the first region 730 exists and/or a difference between the compressive stress of the first bending region 720 and the compressive stress of the first region 730 exists. As a result, the stress generated in the processes for rolling or bending the display device may be efficiently prevented by the base film 710.

Figure 19:
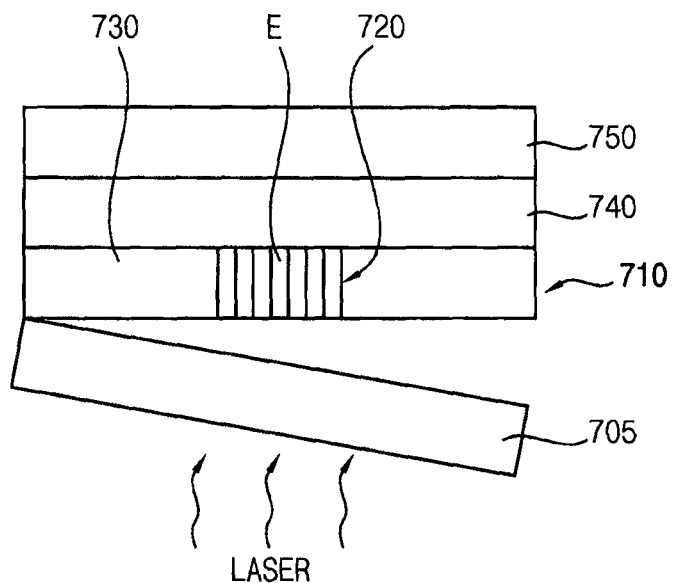

Referring to FIGS. 13 and 19, a laser may be irradiated onto a second face of the base film 710 opposed to the first face of the base film 710 to separate the base film 710 from the supporting substrate 705 (step S570).

Figure 20:
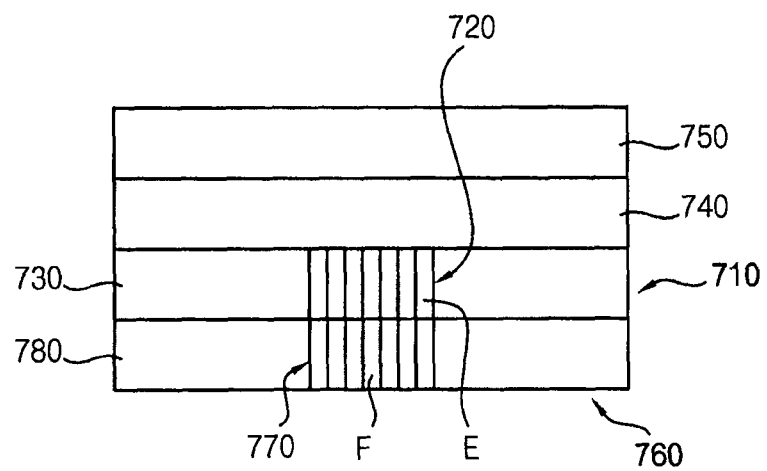

Referring to FIGS. 13 and 20, the protection film 760 may be formed on the second face of the base film 710 (step S580). In example embodiments, the protection film 760 may include a second bending region 770 and a second region 780 adjacent to the second bending region 770. For example, the second bending region 770 may include a material having a modulus of elasticity different from a material having a modulus of elasticity of the second region 780. For example, the second bending region 770 may include a third material having a third modulus of elasticity, and the second region 780 may include a fourth material having a fourth modulus of elasticity substantially larger than the third modulus of elasticity. Alternatively, the second bending region 770 may include a third material having a third coefficient of thermal expansion, and the second region 780 may include a fourth material having a fourth coefficient of thermal expansion substantially smaller than the third coefficient of thermal expansion. Thus, the second bending region 770 and the second region 780 may have different rate of expansions or different rate of contractions, so that a wrinkled portion F may be formed based in a difference between the rates of expansion or a difference between the rates of contractions.

Hereinafter, a method of forming the protection film 760 will be described.

As illustrated in FIG. 14, a first protection thin film may be formed on the second face of the base film 710 (step S610), and then a second protection thin film may be formed on the first protection thin film using a material different from a material of the first protection thin film (step S620)

A third protection thin film may be formed on the second protection thin film using a material substantially the same as a material of the first protection thin film (step S630), and then the protection film 760 may be obtained by cutting the first protection thin film, the second protection thin film, and the third protection thin film (step S640). Here, the protection film 760 including the first to the third protection thin films may be formed using a slit coating process. In example embodiments, a portion of the protection film 760 in which the second protection thin film is located may correspond to a region in which the display device is rolled or bent. For convenience of description, the portion of the protection film 760 in which the second protection thin film is located after cutting the first to the third protection thin films may be defined as the a first bending region 720, a portion of the protection film 760 in which the first protection thin film and the third protection thin film is located after cutting the first protection thin film to the third protection thin film may be defined as the first region 730. In example embodiments, the base film 710 may combine with the protection film 760 by interposing an adhesive member (e.g., a pressure sensitive adhesive (PSA)) between the base film 710 and the protection film 760. Therefore, the display device including the base film 710 having the wrinkled portion E, the display structure 740, the window 750, the protection film 760 having the wrinkled portion F may be obtained.

The method of FIGS. 13 through 20 may manufacture the display device by forming the base film 710 on the supporting substrate 705, by forming the display structure 740, the window 750 on the base film 710, and by separating the base film 710 from the supporting substrate 705. However, the method of manufacturing the display device is not limited thereto. For example, the display device may be sequentially formed using a roll-to-roll process.

Example embodiments of the invention may be employed in any electronic device including a display device. For example, the organic light emitting display device according to embodiments may be used in a notebook computer, a laptop computer, a digital camera, a video camcorder, a cellular phone, a smart phone, a smart pad, a portable multimedia player (PMP), a personal digital assistant (PDA), a MP3 player, a navigation system, a television, a computer monitor, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device comprising:
   a base film including a first bending region having a wrinkled portion and a first region adjacent to the first bending region;
   a display structure disposed on a first face of the base film; and
   a window disposed on the first face of the base film to cover the display structure,
   wherein the first bending region includes a material different from a material of the first region.

2. The display device of claim 1, wherein the first bending region includes a first material having a first modulus of elasticity, and the first region includes a second material having a second modulus of elasticity greater than the first modulus of elasticity.

3. The display device of claim 1, wherein the first bending region includes a first material having a first coefficient of thermal expansion, and the first region includes a second material having a second coefficient of thermal expansion smaller than the first coefficient of thermal expansion.

4. The display device of claim 1, wherein the first bending region reduces a stress generated in rolling of the display device or bending of the display device.

5. The display device of claim 1, further comprising a protection film disposed on a second face of the base film opposed to the first face of the base film.

6. The display device of claim 5, wherein the protection film includes a second bending region having a wrinkled portion and a second region adjacent to the second bending region, and the second bending region includes a material different from a material of the second region.

7. The display device of claim 6, wherein the second bending region includes a third material having a third modulus of elasticity, and the second region includes a fourth material having a fourth modulus of elasticity greater than the third modulus of elasticity.

8. The display device of claim 6, wherein the second bending region includes a third material having a third coefficient of thermal expansion, and the second region includes a fourth material having a fourth coefficient of thermal expansion smaller than the third coefficient of thermal expansion.

9. The display device of claim 6, wherein the second bending region reduces a stress generated in rolling of the display device or bending of the display device.

10. The display device of claim 2, wherein the first material includes at least one selected from the group consisting of polypropylene, polymethylmethacrylate, polydimethylsiloxane, and epoxy-based negative photoresist (SU-8photoresist).

11. The display device of claim 2, wherein the second material includes at least one selected from the group consisting of polystyrene-based resin, polycarbonate-based resin, polyester-based resin, polyethyleneterephthalate-based resin, polyethylenenaphthalate-based resin, polysulfone-based resin, polyurethane-based resin and polyvinyl chloride-based resin.

* * * * *